Feb. 14, 1950

W. J. MILLER
APPARATUS FOR FEEDING PLASTIC
CERAMIC MATERIAL TO MOLDS 2,497,510

Filed June 13, 1946

INVENTOR
William J. Miller.
BY
George J. Cumings
ATTORNEY

Feb. 14, 1950

W. J. MILLER 2,497,510

APPARATUS FOR FEEDING PLASTIC
CERAMIC MATERIAL TO MOLDS

Filed June 13, 1946

INVENTOR
*William J. Miller.*
BY
*George J. Cummings*
ATTORNEY

Feb. 14, 1950 W. J. MILLER 2,497,510
APPARATUS FOR FEEDING PLASTIC
CERAMIC MATERIAL TO MOLDS
Filed June 13, 1946 4 Sheets-Sheet 4

INVENTOR
William J. Miller.
BY
George J. Cuminger
ATTORNEY

Patented Feb. 14, 1950

2,497,510

UNITED STATES PATENT OFFICE 2,497,510

APPARATUS FOR FEEDING PLASTIC CERAMIC MATERIAL TO MOLDS

William J. Miller, Pittsburgh, Pa., assignor to Miller Pottery Engineering Company, Swissvale, Pa., a corporation of Pennsylvania Application June 13, 1946, Serial No. 676,385

24 Claims. (Cl. 25—22)

This invention relates to apparatus for feeding plastic ceramic material to molds in the manufacture of potteryware. It has to do particularly with means for automatically feeding clay to the molds of an automatic jiggering machine.

In making dinnerware automatically, it is customary to transport the jigger molds from station to station on a conveyor constructed to support them in plural, spaced apart, lines or rows, for instance as disclosed in my Patent 2,046,525. Such operations as feeding clay to the lines of molds and fabricating the material are performed periodically during pauses in the forward movement of the conveyor at the stations mentioned. It is customary to feed clay to all of the molds comprising a transverse row simultaneously and in the case of a diverse production, the charges may be different in size and volume of material.

Some of the difficulties experienced heretofore in connection with feeding clay to molds automatically have been the inability to accurately control the volume of clay contained in a charge of material and to reliably produce uniform charges of clay in succession. This is particularly true where the production is diversified and the requirements call for the simultaneous feeding, from a common source, of several charges of clay that differ in size and volume.

One object of this invention is to provide for correcting these difficulties by the exercise of more positive control over the movement of the clay from the point of entrance into the feeding system to the several exits with especial emphasis upon proper distribution of the material throughout the system and the mitigation of physical properties possessed by filter pressed clay which influence or cause improper flow and distribution of the material in a closed feeding system.

Another object of this invention is to provide an improved and novel form of feeder capable of satisfying the feeding requirements of automatic jiggering machinery, particularly large, mass production equipment.

In accordance with this invention, I propose to employ a pair of pug mills, which feed directly into a common manifold from which the clay is caused to flow in a uniform manner into a secondary or distributing manifold where it is directed through several outlets into plural charging cylinders from which the material is delivered, under controlled pressure, to a cutting off position and there severed into charges of predetermined and if desired, different volume or size, and deposited in the molds. As an added feature, the filter press cakes may be fed into the pug mill by a novel apparatus co-operating therewith to mitigate hard and soft concentrations of clay in the pug mill and thus remove these as influences upon flow and distribution of the clay.

In the drawings:

Figure 12 is a detail in section of a circuit breaker.

Figure 1:
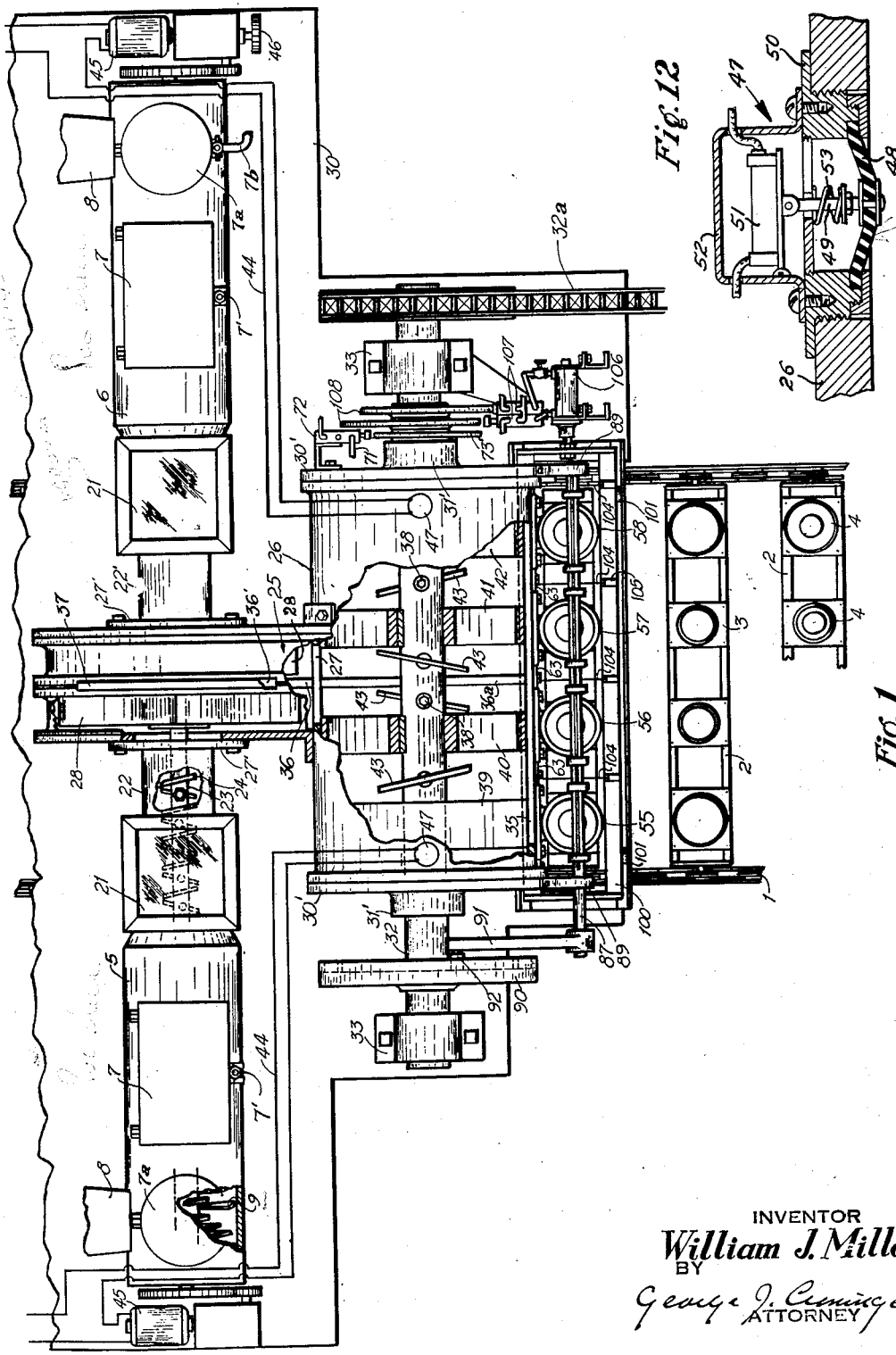
Figure 1 is a plan view of the feeding apparatus with some of the parts broken away.

The clay supplying, conditioning, conveying, distributing and feeding means hereof is shown in association with a mold conveyor 1, Figure 1, provided with spaced trays 2 having individual mold stands 3 in which groups of diverse molds 4 are carried in traverse, parallel rows to the mold charging station to simultaneously receive charges of clay that are automatically fed thereto by the feeding apparatus hereof. The clay requirements of the molds, as between the longitudinal lines of molds, are not always the same which is typical of a diverse production. The feeder, as will be hereinafter explained, is adapted to feed charges of clay of different predetermined volume, thickness and diameter simultaneously to the several molds comprising a transverse row of molds.

Figure 6:
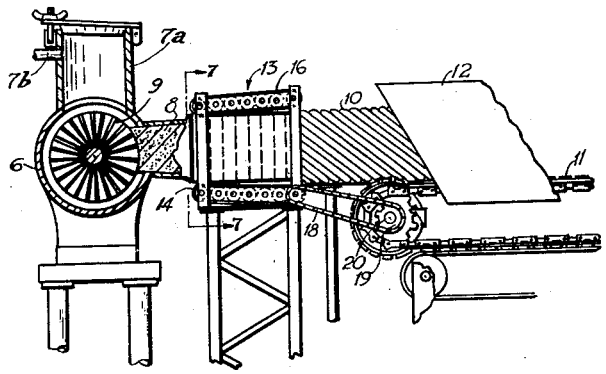
Figure 6 is a side elevation, partly in section of apparatus for supplying clay to the pug mill hereof.
Figure 7:
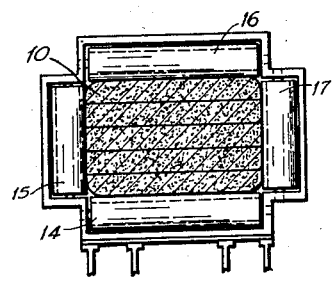
Figure 7 is a vertical section taken on the line 7—7 of Figure 6.

I prefer to utilize conventional, plastic, filter pressed clay which is delivered from the filter presses in the form of disc-like cakes to the pug mills 5 and 6 and either hand conveyed and thrown thereinto through a feed opening, (shown herein as being closed with a hinged cover plate 7 capable of sealing the opening when closed and fastened down by nut 7') manually, but preferably conveyed and progressed at a predetermined speed and volume automatically, mechanically into the pug mill as shown in Figures 6 and 7 and disclosed in my co-pending application Serial Number 539,258, filed June 8, 1944. However, preconditioned clay in other forms may be employed.

The barrel of each pug mill 6 and 7, Figure 1, is provided with a side inlet, Figure 6, through which a continuous column of superimposed, inclined filter cakes 10, are progressed from the filter press through nozzle seal 8 into the interior where the multitude of small knives 9, shave, mix, mascerate and progress the material from the leading end of the column. To form this continuous column of clay, the filter cakes 10 as they are manually stripped from the filter press, are layed one against the other in a forwardly inclined position upon a conveyor 11, which carries them through a conditioning chamber 12 and then pushes them into a rectangular reducer 13 whose outlet is formed by the nozzle 8 and which serves as a seal to facilitate the establishment of a sub-atmospheric condition within the barrel at the dessicated position. The reducer comprises a frame carrying four convergingly inclined roller supported belts 14, 15, 16 and 17, Figure 7, the lower of which is driven by chain 18 and sprocket 19 on drive shaft 20 of cake conveyor 11. These belt conveyors are arranged as a hollow, square or rectangle and form a tapered throat which squeezes the column of filter cakes into nozzle 8. Some of the advantages of this method of feeding clay to a pug mill have been partially set forth in my co-pending application.

A sub-atmospheric condition is maintained inside the pugging chamber by means of a vacuum dome 7a, Figure 1, to which a vacuum line 7b, leading from a source of vacuum (not shown) is connected.

Thus much manual labor is eliminated and filter cakes automatically supplied to the pug mill in step with the inherently varied quantity required by the feeders. The method of shaving material under vacuum from a composite mass composed of a multiple of misaligned, overlapping cakes and from different portions of each cake avoids high concentrations of clay of the same hard or soft consistency in the pug mill. Consequently the mixture of the inherently different consistency zones in each cake and of various cakes into a homogeneous, evenly and fine textured body is greatly facilitated.

Incident to leaving the pugging chamber, the clay is shredded and forced into the vacuum chamber 21, Figure 1, associated with each pug mill and again subjected to sub-atmospheric pressure to remove any remaining occluded air. Rather than remove the material from the vacuum chamber by means of the conventional auger, which trowels and forms a detrimental tenacious skin on all contacting portions of clay, I prefer to move the same through conduits 22 and 22' Figure 1, respectively by means of a large number of relatively narrow inclined mixing and pusher blades 24 on driven shaft 23 arranged at the proper angle to propel without perceptively troweling the clay forwardly through the tubular conduits 22 and 22' into a primary manifold 25.

Manifold 25 is formed as a split, circular casing having large, axial openings in each radial face and a circumferential opening which, when the casing is bolted to the side of the tubular housing 26 of a secondary manifold, registers with the inlets 27 therein.

To move clay from the primary manifold into the secondary manifold, the shaft 23 of each pug mill extends into the primary manifold and has fixed thereon a clay impeller in the form of a spiral snail 28 which revolve with their respective shafts and force clay from the inlet 27 into the interior of the secondary manifold.

The interior of manifold 25 may be centrally divided into two separate chambers by providing a vertical partition in the form of a stationary lower section 36 and a vertically movable upper section 37 removable through a slot 36', Figure 1. The partition enables employment of two different type clays simultaneously and repair of one side while production on the other side subsists and feeding clay through one pug faster than through the other. The upper section 37 is removable or vertically adjustable in slot 36' to control the volume of clay by-passed therethrough.

Figure 2:
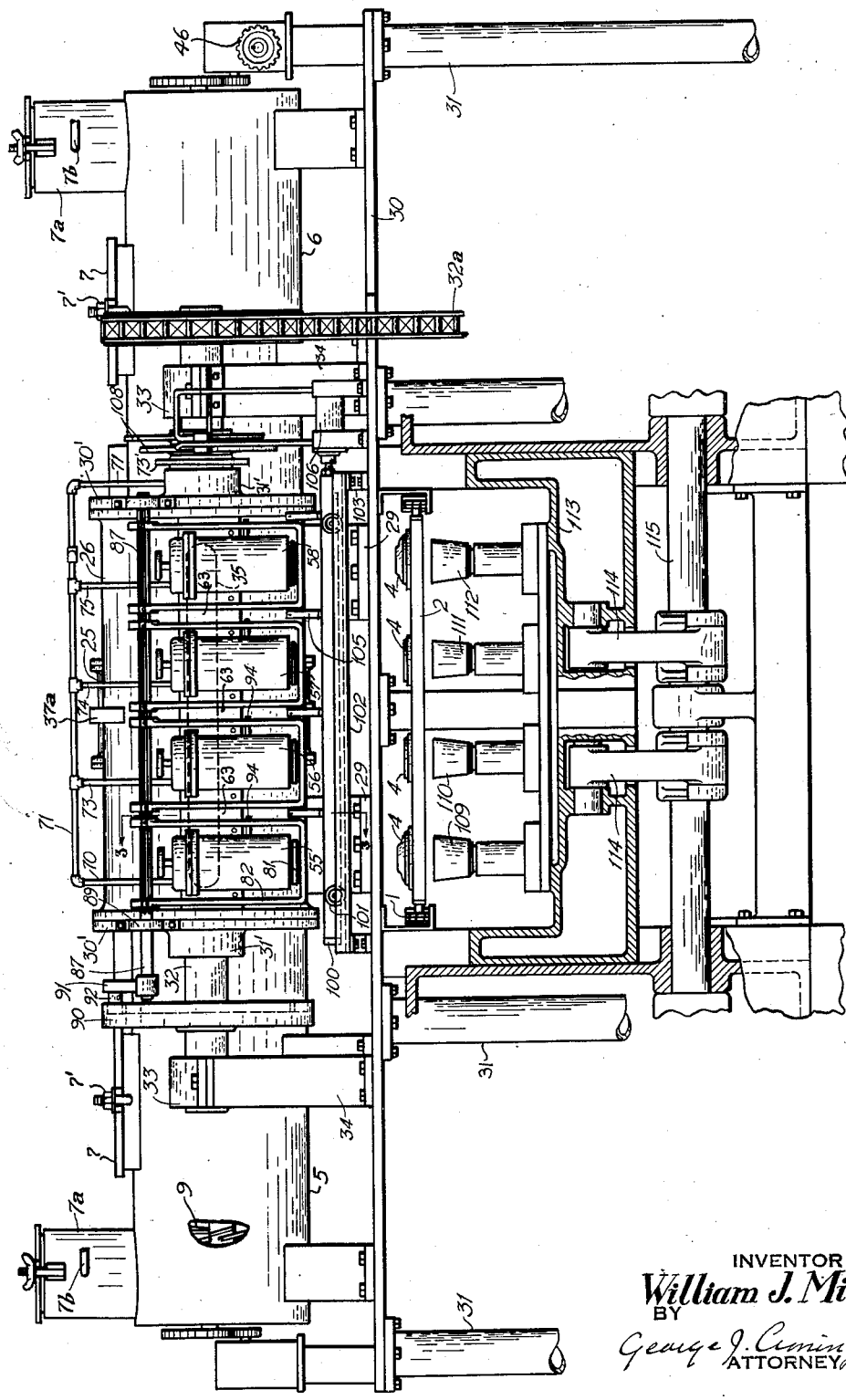
Figure 2 is a front elevation of the apparatus of Figure 1 with some of the parts broken away.

Manifold 26 is supported by cradles 29, Figure 2, which rests upon a floor plate 30 supported by end posts 31. The ends of the housing 26 are closed by caps 30', Figure 2, having bearings 31 for rotatable shaft 32 which is also journaled in outboard bearings 33 on stands 34 bolted to the floor plate 30.

Manifold 26 is provided with a side outlet in the form of a slot 35, Figure 1, extending lengthwise of the housing and to move clay from the interior of the manifold therethrough, shaft 32 has clay propelling means fixed thereon, in the form of spiral snails 39, 40, 41 and 42. To direct the incoming clay endwise toward the snails on each side of the inlet 27, shaft 32 has fixed thereon angularly adjustable clay propelling, proportioning and directing blades 43, said blades being adjusted to the correct angle through nuts 38 to obtain the extent of and directional movement desired.

Manifold 26, Figure 1, may also be centrally divided into two separate chambers by a partition in the form of a stationary lower section 36a and a vertically movable upper section 37a, Figure 2, as and for the purposes previously described in connection with the central partition of manifold 25.

To avoid abnormal pressures inside either end of manifold 26 and possible stalling its associated pug, the electrical circuit 44 to each pug mill drive motor 45 has a circuit breaker 47 installed therein that is operable in response to abnormal increases in pressure inside its associated manifold 26. The circuit breakers are located near opposite ends of the manifold and comprise a rubber diaphragm 48, Figure 12, to which a push rod 49 is attached. The diaphragm is secured across the end of a tubular fitting 50 screwed into a hole in the manifold and has a mercury switch 51 pivotally mounted inside the cap 52 in such position that an upthrust by rod 49 will tilt the switch and break the circuit. An adjustable tension spring 53 determines the pressure at which the circuit breaker will operate. When the motor 45 associated with either pug is thus deenergized, a power take-off 46 by means of which shaft 20, Figure 6, may be driven is also stopped thereby discontinuing any further feeding of clay into said pug mill. Shaft 32 is driven from another source by chain 32a and continues to revolve and force clay from manifold 26 through the segregating outlet 35, then, as soon as the pressure inside the manifold drops, the circuits are automatically reclosed and normal feeding of clay into manifold 26 resumed.

Figure 4:
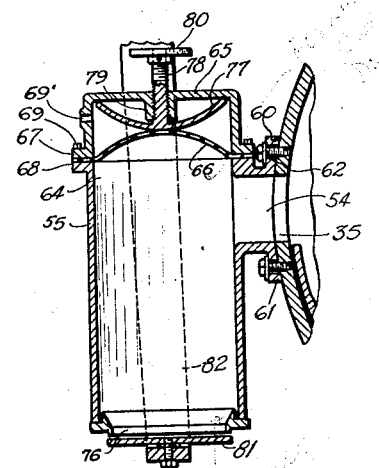
Figure 4 is a vertical section taken through one of the charging cylinders.

Clay is forced from manifold 26 through the outlet 35, through inlet 54, Figure 4, of each cylinders 55, 56, 57 and 58, Figure 2, respectively. Each cylinder is formed with a flange 61 having a surface 60 curved to fit the outside of the manifold provided with oversize bolt holes 62 therein to allow for a limited amount of adjustments of the charging cylinders in centering them over the lines of molds. Said charging cylinders 55, 56, 57 and 58 may be bolted to the manifold 26 at any desired spacing by providing a line of threaded holes or T slots (not shown) across manifold above and below slot 35 for bolt securement. Slot 35 is closed between charging cylinders by cover plates 63, Figure 1, that are bolted to the manifold.

Each charging cylinder is formed with a clay receiving chamber 64, Figure 4, and has a dome shaped cap 65. A flexible or rubber diaphragm 66 extending across the top of the chamber is gripped between the cap flange 67 and the cylinder flange 68 which are held together by screws 69. The cap 65 of each cylinder has a side inlet 69' above the diaphragm to be connected by a pipe 70, in the case of cylinder 55, Figure 2, to a high pressure fluid line 71 leading from valve 72, Figure 1, which is operated by adjustable cam 73 on shaft 32. The diaphragm chambers of charging cylinders 56, 57 and 58, Figure 2, are connected to line 71 by pipes 73, 74 and 75 respectively. To periodically distend the diaphragm 66 and thereby eject a predetermined volume of clay through the outlet 76, Figure 4, of each charging cylinder, fluid under pressure is admitted to all of the diaphragm chambers simultaneously when the gates are open and the molds are in position below the orifice 76 of the cylinders forcing said diaphragms downwardly to cause predetermined volumes of clay to be extruded through the several outlets onto the molding surfaces of the molds thereunder. Line 71 is vented by the reversal of valve 72 and vacuum substituted to aid fresh clay being forced in through the several inlets 54 to force the several diaphragms upwardly into the domes until further progress is prevented by a circular, hemispherical member 77, Figure 4, secured to a center screw 78 threaded into boss 79 and secured to a hand wheel 80 above the chamber. The distance to which member 77 is screwed into the diaphragm chamber determines its capacity and the volume of clay that will be extruded therefrom each feeding impulse.

Figure 5:
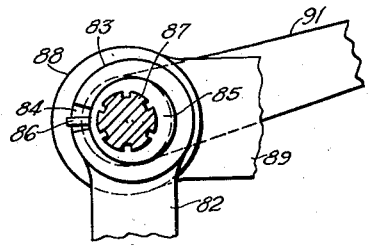
Figure 5 is an enlarged fragmentary detail of an eccentric associated with the gate actuating means.

I prefer to close the orifice 76 of each charging cylinder during the time it is being charged with clay and for this purpose, each outlet is covered by a movable and vertically adjustable gate 81, Figure 4, secured by an adjusting screw 81' to a bail 82 having the form of an inverted U. The upper ends 83 of each bail, Figure 5, are bossed and bored out and a tapered, rectangular hole 84 is made in the rim. An eccentric ring 85 is journaled into each boss 83 and a pin 86, smaller than the length of the hole 84 is inserted therein and screwed into the ring. Each ring 85 is splined and fitted on splined shaft 87 journaled in outboard bearings 88 supported by brackets, secured to caps 30' at the ends of manifold 26, Figure 2, said shaft extending across and above the charging cylinders.

Figure 3:
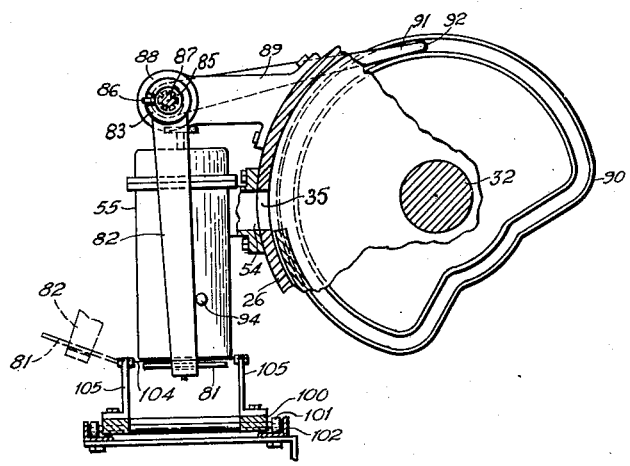
Figure 3 is a detail view showing one of the charging cylinders and the gate operating means.

To operate the gates, all of which are opened and closed in unison, a track cam 90 is provided which is fixed on shaft 32, Figure 2, and is operable to raise and lower lever 91 having a roller 92 at one end riding in the cam track. The other end of said lever is fixed to spline shaft 87. Thus, as viewed in Figure 3, when the roller end of lever 91 is lowered by cam 90, the eccentric rings 85 are turned in their bosses 83 to the limit permitted by pins 86 in slot 84 and the eccentric causes the gates 81 to be lowered from the outlets 76. Then upon continued turning of shaft 87, each pin 86 engages the end wall of its respective slot 84 and gates 81 are swung in an arc forwardly, as viewed in Figure 3, away from under orifices 76 and upwardly to clear cutting wires 104 and the posts 105 supporting them. These operations function just prior to the valve 72 and diaphragms 66 which extrude clay charges from the cylinders through orifices 76. The gates are held in open position until the clay extruded from the charging cylinders is cut off and deposited onto the molds therebelow and the cutters have been retracted. The gates are closed and raised when cam 90 raises lever 91. The weight of the gates holds pins 86 against the top of the holes 84, see Figure 5, as the gates are lowered and until the bail arms strike the stop pins 94 projecting from the sides of the charging cylinders, Figures 2 and 3, whereupon continued rotation of shaft 87 pulls the gates up tight against the orifice 76.

To cut off the charges of clay from the material extruded from the charging cylinders I provide a gang cutter in the form of an open frame 100, Figures 1 and 2 mounted on rollers 101 that rest on a track 102 formed of parallel angles mounted on supports 103 bolted to the floor plate 30. The transversely positioned cutting wires 104 are adjustably tensioned between spaced pairs of posts 105 bolted to the frame 100. The cut is preferably made flush with the orifices lower brim which is chamfered away therefrom to enable close up cutting and to insure narrow brim seal on gate 81 thus avoiding any long protruding cauda which might interfere with properly closing the gates. I provide also for elevating the cauda after cutting and before the wire starts its return travel to thus avoid fouling the wire and also avoid cutting a shaving off the cauda face by applying vacuum thereabove through reversal of valve 72 to apply vacuum through pipe 71 above diaphragm 66.

The frame 100 is reciprocated by an air cylinder 106 controlled by valves 107 and adjustable cams 108 on shaft 32. As illustrated in Figure 2, the cut is made by moving frame 100 to the left, and then immediately after cauda retraction, retracting the frame, all whilst the gates remain open. In retracted position, the cutter wire and supporting posts 105 are positioned clear of the bail 82 and gates 81 to permit the gates to be swung and raised without interfering.

Just prior to the time the charges of clay are cut off, a tray load of molds is spotted at the mold charging position directly over the mold lifting chucks 109, 110, 111 and 112, Figure 2. These chucks are supported by a vertically movable crosshead 113 which is raised by jointed cranks 114 when shaft 115 is partially rotated. The chucks lift the moulds out of their seats on the trays 2 and carry them up into optimum proximity to the orifices 76. In this way, the altitude and consequent drop extent of the charges relative to the mold forming surface may be precisely controlled.

Figure 8:
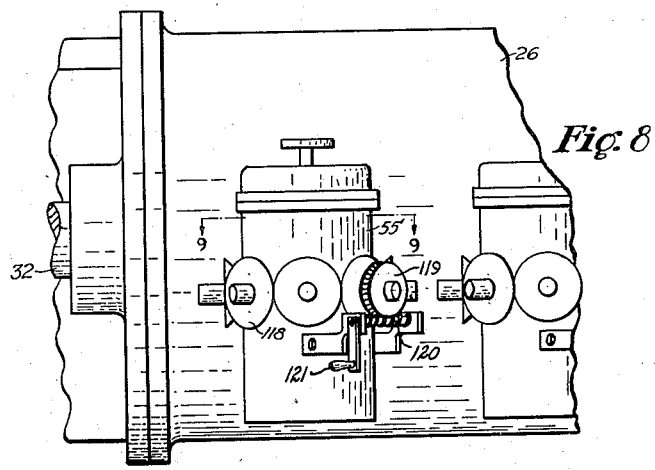
Figure 8 is a plan view showing a modified form of charging cylinder.
Figures 9, 10:
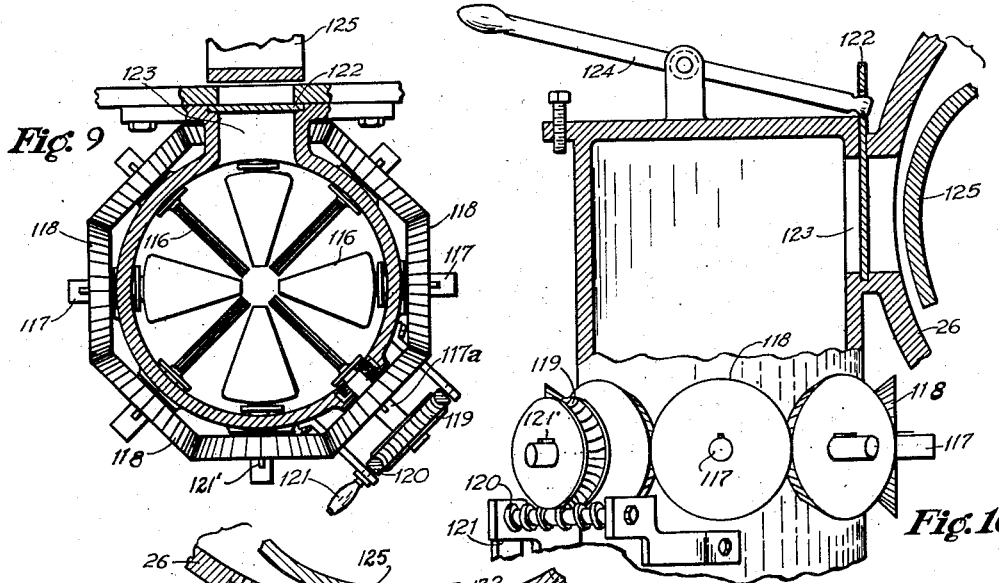
Figure 9 is a horizontal section taken on line 9—9 of Figure 8.
Figure 10 is a fragmentary detail, partly in section illustrating a manually operated gate for closing the side inlet to the charging cylinder.

Figure 8 shows flow control means in the form of regulable baffles which may be associated with either type of feed control cylinder. A plurality of tapered, blades or baffles 116, Figure 9, are arranged in a circle inside the casing with alternate baffles shown turned 90° to those on each side. Each baffle is fixed on a shaft 117 journaled in the cylinder casing. Upon the outer end of each shaft a gear 118 is fixed which meshes with the gears on either side thereof. One of the shafts 117a is elongated and has a worm wheel 119 thereon to be rotated by a worm 120 turned by hand crank 121. The angular position of any one of the baffles relative to another may easily be changed by withdrawing pin 121' from shaft 117, removing the gear and turning the baffle to the desired position. Thus, the amount and zone of restriction also clay flow direction may be adjusted manually either through use of the hand crank 121 and/or by individual adjustment of the baffles. Furthermore, clay flow inside the charging cylinder and consequently through the orifice may be directed towards one side or the other of the outlet as for example, by turning all the baffles on one side of the chamber to a level position and those on the other to a vertical position and/or positioning the opening 130 to right or left through adjustment of valves 133 and 134, Figure 11. Thus I am enabled to insure uniform cross sectional flow through the orifice 76 and uniform thickness charge disc and cauda protrusion of slice incident to cutting.

If clay flow through a charging cylinder is to be discontinued for a brief interval, as for instance, during the time fabricating tool changes are being made, a reciprocable valve 122, sliding across the inlet 123, Figures 9 and 10, is provided. Said valve is moved manually by means of pivoted lever 124.

In Figure 10, the diaphragm is shown as omitted, a side inlet is provided, and snail 125 pressure plus flow control regulation through baffles 116, Figure 9, and gates 122, Figure 10, are used to control the shape and volume of the charges.

Figure 11:
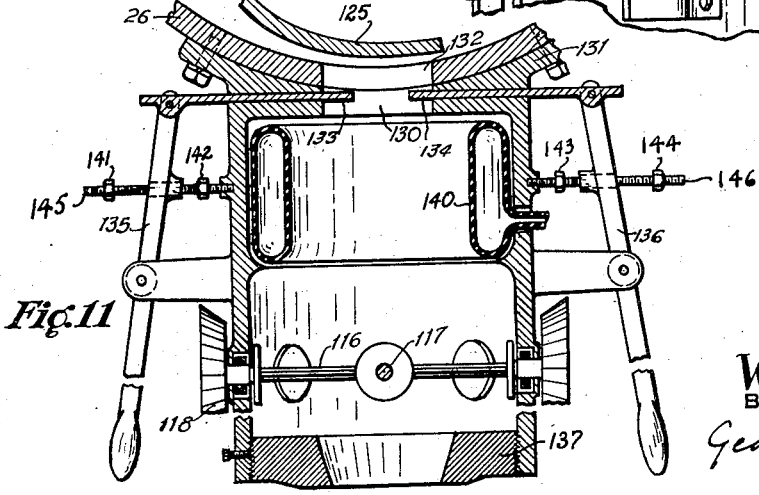
Figure 11 is a sectional elevation illustrating a charging cylinder provided with a top inlet and a modified form of manually operated closure therefor.

If desired, a top inlet 130 may be provided as shown in Figure 11. The diaphragm 140 may be annular and nonadjustable. The volume of clay in the charge then is controlled by baffles 116, Figure 9, and valve 122, Figure 10, plus control of the pressure, volume and/or length of time of effective application of inflating fluid, preferably hydraulic. The valve may comprise opposed slides 133 and 134 manually operated by adjustable maximum throw levers 135 and 136 respectively pivoted on the side of the casing. These slides provide means for adjusting the maximum and/or minimum inlet opening, as by nuts 141 and 142, and 143 and 144, on studs 145 and 146, respectively. They also provide means for adjusting the lateral position of the inlet, and for completely shutting off and otherwise controlling the opening at will. Also a vertically adjustable and exchangeable, restricted, tapered orifice bushing 137 is preferably employed in any one of the various forms of charging cylinders illustrated.

I claim:

1. Clay feeding apparatus comprising, a pair of pug mills, a primary manifold for receiving the discharge therefrom, a secondary manifold for receiving the discharge from the first manifold, a plurality of fluid actuated chargers associated with the second manifold, and power driven spiral snails associated with each manifold for forcing clay therefrom.

2. In combination with apparatus for transporting pottery molds from station to station, a clay feeding apparatus at one of the stations comprising, a pair of pug mills, a primary manifold for receiving the discharge therefrom, a second manifold for receiving the discharge from the first manifold, a plurality of fluid actuated chargers having outlets at the feeding position, cutting means below said outlets for severing charges of clay from the material issuing from the outlets, and power driven, rotatable snails for forcing clay from each manifold.

3. Clay feeding apparatus comprising, a pair of pug mills, means for automatically supplying plastic clay to one of them, a primary manifold for receiving the discharge from both pug mills, a second manifold for receiving clay from the first manifold, a plurality of fluid actuated chargers associated with the second manifold, spiral snails driven by the pug mills for forcing clay from the first manifold into the second manifold and power driven spiral snails inside said second manifold for forcing clay into the chargers.

4. Clay feeding apparatus comprising, a pair of pug mills, each having an extrusion outlet and a filling opening, a nozzle connected to one of the filling openings through which material is fed to the interior of the pug mill to be shaved off by the pug mill knives, a primary manifold connected to the extrusion outlet of each pug mill, a pair of spiral snails inside said manifold to be driven by said pug mills to force clay from said manifold, a second manifold having an inlet for receiving the discharge from the primary manifold and a plurality of outlets, a rotatable spiral snail associated with each outlet for forcing clay therethrough, a fluid actuated charging cylinder associated with each outlet and having a discharge orifice, a gate for each orifice, means for actuating said gates, and a cutter operating below each orifice for severing clay from the material discharged therethrough to be deposited in molds therebelow.

5. Clay feeding apparatus comprising, a pair of pug mills, a manifold common to both pug mills for receiving material therefrom, said manifold having an outlet, a second manifold having an inlet connected to the outlet of the first manifold and a plurality of discharge outlets, means driven by the pug mills for forcing clay from the first manifold into the second manifold, rotary clay propelling means associated with each discharge outlet for propelling clay therethrough, a charging cylinder associated with each discharging outlet for receiving clay therefrom, each charging cylinder having a discharge orifice, fluid operated means for ejecting clay from said charging cylinders, a gate for each discharge orifice, means for opening and closing said gates, a reciprocable cutting means below said orifices and means for reciprocating said cutting means to effect the cutting off and delivery of clay charges to molds therebelow.

6. Clay feeding apparatus comprising a pair of deairing pug mills, means for feeding filter cakes through an opening in one of the pug mills into engagement with the pug mill knives to be cut off thereby, a manifold common to both pug mills for receiving material therefrom, said manifold having an outlet, a second manifold having an inlet connected to the outlet of the first manifold and a plurality of discharge outlets, means driven by the pug mills for forcing clay from the first manifold into the second manifold, rotary clay propelling means associated with each discharge outlet for propelling clay therethrough, a charging cylinder associated with each discharge outlet for receiving clay therefrom, each charging cylinder having a discharge orifice, fluid operated means for ejecting clay from said charging cylinders, a gate for each discharge orifice, means for opening and closing said gates, a reciprocable cutting means below said orifice and means for reciprocating said cutting means to effect the cutting off and delivery of clay charges to molds therebelow.

7. Clay feeding apparatus comprising, a pair of pug mills, a primary manifold for receiving the discharge from both pug mills, a pair of spiral snails inside said manifold rotated by said pug mills for discharging clay therefrom, a second manifold for receiving the discharge from the first manifold having a plurality of outlets and a rotatable spiral snail associated with each outlet for forcing clay therethrough, a fluid actuated charging cylinder associated with each outlet for receiving clay therefrom, said cylinders each having a discharge orifice and means for cutting off the material forced through said discharge orifices.

8. Clay feeding apparatus comprising, a pair of pug mills, a drive therefor, a clay receiving manifold common to both pug mills having an outlet, a second manifold having an inlet connected to said outlet, said second manifold having a plurality of discharge outlets, rotary means, driven by the pug mills, for forcing clay from the first manifold into the second manifold, rotary clay propelling means inside said second manifold and associated with each discharge outlet for propelling clay therethrough, a charging cylinder associated with each discharge outlet for receiving clay therefrom, each charging cylinder having a discharge orifice, fluid operated means for ejecting clay from said charging cylinders, a reciprocable cutter below said orifices and means operable in response to an increase in pressure inside the second manifold for interrupting the pug mill drive.

9. Clay feeding apparatus comprising, a pair of pug mills, a manifold for receiving the discharge from said pug mills, a second manifold having a plurality of discharge outlets, rotary clay propelling means for forcing clay from the first manifold into the second manifold, a charging cylinder associated with each discharge outlet, fluid operated means for forcing clay therefrom, a reciprocable cutter below said charging cylinder, a gate for each charging cylinder, and means for operating all of said gates simultaneously comprising, a shaft for supporting all of said gates and a cam for rotating said shaft.

10. Clay feeding apparatus comprising, a pair of pug mills, a clay receiving manifold common to both pug mills for receiving material therefrom, said manifold having an outlet, a second manifold having an inlet connected to the outlet of the first manifold and a plurality of discharge outlets, means driven by the pug mills for forcing clay from the first manifold into the second manifold, rotary clay propelling means associated with each discharge outlet for propelling clay therethrough, a charging cylinder associated with each discharge outlet for receiving clay therefrom, each charging cylinder having a discharge orifices, a gate associated with each discharge orifice for closing the same, a bail supporting each gate, a shaft common to all of said bails, an eccentric connection between said bails and said shaft whereby said gates are moved downwardly away from or upwardly toward the discharge orifices and a cam for turning said shaft.

11. Clay feeding apparatus comprising, a manifold having an inlet and a plurality of outlets, a driven shaft extending through said manifold, a spiral snail fixed on said shaft in line with each outlet to force clay therethrough upon rotation of said shaft, a charging cylinder for each outlet having an inlet in register with an outlet and a discharge orifice, a movable gate for each discharge outlet, a cam actuated shaft for operating all of said gates simultaneously, fluid actuated means associated with each charging cylinder for forcing clay through said discharge orifices and means for operating said fluid actuated means simultaneously.

12. Clay feeding apparatus comprising, a manifold having an inlet and a plurality of outlets, a driven shaft extending through said manifold, a spiral snail fixed on said shaft in line with each outlet to force clay therethrough upon rotation of said shaft, a charging cylinder for each outlet having an inlet in register with an outlet and a discharge orifice, a movable gate for each discharge orifice, means for opening and closing said gates, a fluid actuated diaphragm in each charging cylinder for forcing clay through said discharge orifices, and means for controlling the operation of said fluid actuated diaphragm.

13. Clay feeding apparatus comprising a manifold for receiving a quantity of clay, said manifold having an inlet and a plurality of outlets, a charging cylinder associated with each outlet having a discharge orifice and fluid operated means for forcing clay through said discharge orifice, and a rotary impeller associated with each outlet and located inside the manifold for forcing clay through said outlets into said charging cylinders.

14. Clay feeding apparatus comprising a manifold for receiving a quantity of clay, said manifold having an inlet and a plurality of outlets, a charging cylinder associated with each outlet having a discharge orifice and a fluid operated diaphragm for forcing clay through said discharge orifices, and a rotary impeller associated with each outlet and located inside the manifold for forcing clay through said outlets into said charging cylinders.

15. Clay feeding apparatus comprising, a pair of pug mills, a primary manifold for receiving the discharge therefrom, a secondary distributing manifold for receiving the discharge from the first manifold, a plurality of fluid actuated chargers, associated with the second manifold, manually operated gates for controlling the flow of clay from the second manifold into the chargers, rotary, power driven, spiral snails for forcing clay from each manifold and adjustable flow control means in each charger for controlling the flow of clay therethrough.

16. Clay feeding apparatus comprising, a pair of pug mills, a primary manifold for receiving the discharge therefrom, a secondary distributing manifold for receiving the discharge from the first manifold, a plurality of fluid actuated chargers associated with the second manifold, power driven spiral snails for forcing clay from each manifold and adjustable flow control means inside each charger.

17. Clay feeding apparatus comprising, a manifold having a side outlet, a charging cylinder mounted thereon having a side inlet in register with said outlet and a discharge orifice, a manually controlled gate associated with said outlet, a plurality of individually regulable baffles inside said charging cylinder and means for manually turning all of them simultaneously from one position to another.

18. Clay feeding apparatus comprising a manifold having a bottom outlet, a charging cylinder mounted thereon having a top inlet in register with said outlet and a discharge orifice, a pair of manually operated gate members associated with said outlet and flow control means for governing the flow of clay through said cylinder including a plurality of individually regulable baffles inside said cylinder and means for manually turning all of them simultaneously from one position to another.

19. Clay feeding apparatus comprising a manifold having a side outlet, a charging cylinder mounted thereon having a side inlet in register with said outlet and a discharge orifice, fluid actuated means for forcing clay from said cylinder through said discharge orifice and means for governing the flow of clay through said cylinder including a plurality of individually regulable baffles inside said cylinder and means for manually turning all of them simultaneously from one position to another.

20. Clay feeding apparatus comprising a manifold having an inlet and an outlet, a charging cylinder mounted thereon having an inlet in register with the outlet and a discharge orifice, and means for controlling the flow of clay through said cylinder including a plurality of individually regulable baffles and means for turning all of them simultaneously from one position to another.

21. Clay feeding apparatus comprising a pair of opposed pugmills, each having a discharge outlet and an inlet, clay conveying means associated with each inlet for carrying plastic clay thereinto, means inside the pugmill for mascerating the incoming clay prior to pugging, a primary manifold for receiving the discharge from both pug mills and arranged between them and in sealed relation with the discharge outlets, a second manifold for receiving clay from the first manifold, having a plurality of outlets through which clay is discharged to molds therebelow, rotatable clay moving means inside the primary manifold and actuated by the pug mills for forcing clay from the primary manifold into the second manifold and rotatable clay moving means inside the second manifold arranged to periodically force clay through the outlets and means for rotating said last named clay moving means.

22. Clay feeding apparatus comprising, a pair of opposed pug mills each having a drive and an inlet and an outlet, a primary manifold arranged between them in sealed relation with the outlets said manifold having an outlet, clay impelling means, driven by the pug mills and inside said manifolds for moving clay through the manifold outlet, a second, larger capacity manifold, having an inlet arranged to receive the discharge from the outlet of the primary manifold and having a plurality of outlets through which clay is discharged, means inside said second manifold for moving clay through the outlets thereof, drive means, independent of the pug mill drive, for actuating said last named clay moving means, and pressure responsive means associated with said second pug mill for interrupting the operation of either one or both of the pug mill drives.

23. Clay feeding apparatus comprising, a pair of opposed pug mills each having an independent drive, a clay receiving manifold arranged between them and into which each pug mill discharges, a second manifold in closed communication with the first manifold for receiving the discharge therefrom and having a plural outlet through which clay is discharged, pressure responsive means associated with the second manifold for interrupting the discharge of clay into the first manifold and independently powered means for forcing clay from the second manifold through the outlets thereof.

24. Clay feeding apparatus comprising, a pair of opposed pug mills each having an outlet, a manifold common to both pug mills for receiving the discharge therefrom and a discharge outlet, a second manifold connected to the first manifold and having a plurality of discharge outlets through which clay is forced to molds therebelow, clay moving means inside said second manifold for causing the clay to be discharged through said outlets, a drive for said clay moving means, clay cutting means adjacent the outlets of said second manifold and means operated from the drive for controlling the actuation of the clay cutting means.

WILLIAM J. MILLER.

REFERENCES CITED

The following references are of record in the file of this patent:

UNITED STATES PATENTS

| Number | Name | Date |
|---|---|---|
| 2,065,124 | Dreyfus et al. | Dec. 22, 1936 |
| 2,278,513 | Emerson | Apr. 7, 1942 |
| 2,374,553 | Miller | Apr. 24, 1945 |

Certificate of Correction

Patent No. 2,497,510 — February 14, 1950

WILLIAM J. MILLER

It is hereby certified that errors appear in the printed specification of the above numbered patent requiring correction as follows:

Column 3, line 28, for "dessicated" read *desiccating*; column 4, line 3, for the word "inlets" read *inlet*; line 27, for "bearings 31" read *bearings 31'*; column 9, line 74, for "orifices" read *orifice*; column 12, line 26, for "a plural outlet" read *plural outlets*; and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*